US012619410B2

(12) United States Patent
Gupta et al.

(10) Patent No.: US 12,619,410 B2
(45) Date of Patent: May 5, 2026

(54) SYSTEMS AND METHODS FOR AUTOMATED MESH SERVICE-BASED DEPLOYMENT INTELLIGENCE

(71) Applicant: BANK OF AMERICA CORPORATION, Charlotte, NC (US)

(72) Inventors: Veerendra Gupta, Hyderabad (IN); Atul Bhaskarrao Dhomne, Hyderabad (IN); Srinivasa Murthy Penubothu, Frisco, TX (US); Jeff Schommer, Carrollton, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 303 days.

(21) Appl. No.: 18/413,851

(22) Filed: Jan. 16, 2024

(65) Prior Publication Data

US 2025/0231749 A1     Jul. 17, 2025

(51) Int. Cl.
*G06F 11/36* (2025.01)
*G06F 8/60* (2018.01)
(Continued)

(52) U.S. Cl.
CPC ................ *G06F 8/60* (2013.01); *H04L 67/12* (2013.01); *H04L 67/51* (2022.05)

(58) Field of Classification Search
CPC .......... G06F 8/60; G06F 11/004; G06F 40/40; G06F 11/008; G06F 11/0769;
(Continued)

(56) References Cited

U.S. PATENT DOCUMENTS 10,612,999 B2    4/2020   Ide
11,126,493 B2    9/2021   Guha
(Continued)

OTHER PUBLICATIONS

Sriraman et al., A machine learning approach to predict DevOps readiness and adaptation in a heterogeneous IT environment, 10 pages (Year: 2023).*

*Primary Examiner* — Thuy Dao
(74) *Attorney, Agent, or Firm* — Moore & Van Allen PLLC; Nicholas C. Russell

(57) ABSTRACT

Systems, computer program products, and methods for an automated mesh service-based deployment intelligence system are provided. This system is designed to streamline the deployment of software by integrating a processing device and a non-transitory storage device. The storage device contains instructions that, when executed by the processing device, enable the ingestion of data from various sources such as monitoring systems, databases, and application performance management tools. Once ingested, the data is stored and processed to discern deployment patterns and detect any anomalies. Utilizing a machine learning model, the system anticipates potential deployment issues by analyzing this data. It then orchestrates the deployment of software artifacts accordingly, taking into account the insights gained from the machine learning model. Furthermore, the system is capable of real-time optimization of the deployment process to preemptively resolve any predicted issues, thereby enhancing the efficiency and reliability of software deployment operations.

20 Claims, 7 Drawing Sheets

(51) Int. Cl.

| | |
|---|---|
| *G06F 8/65* | (2018.01) |
| *G06F 16/22* | (2019.01) |
| *G06N 20/00* | (2019.01) |
| *H04L 29/06* | (2006.01) |
| *H04L 67/12* | (2022.01) |
| *H04L 67/51* | (2022.01) |

(58) Field of Classification Search

CPC .. G06F 11/3688; G06F 11/0721; H04L 67/51; H04L 67/12; G06N 3/0455; G06N 20/00; G06N 5/045

See application file for complete search history.

(56) References Cited

U.S. PATENT DOCUMENTS

| | | | |
|---|---|---|---|
| 11,231,705 | B2 | 1/2022 | Cella |
| 11,295,238 | B2 | 4/2022 | Tabuchi |
| 11,372,394 | B2 | 6/2022 | Cella |
| 11,398,945 | B2 | 7/2022 | Volksen |
| 11,429,574 | B2 * | 8/2022 | Cheng ................ G06F 16/2255 |
| 11,478,927 | B1 | 10/2022 | Kranski |
| 11,520,326 | B2 | 12/2022 | Bhattiprolu |
| 11,606,368 | B2 | 3/2023 | Aksela |
| 11,734,590 | B2 | 8/2023 | Hamilton |
| 11,761,427 | B2 | 9/2023 | Zhao |
| 11,874,415 | B2 | 1/2024 | Siebenschuh |
| 12,265,616 | B2 * | 4/2025 | Magen Medina .. G06F 9/45558 |
| 2020/0285997 | A1 | 9/2020 | Bhattacharyya |
| 2020/0342988 | A1 | 10/2020 | Lymperopoulos |
| 2021/0273953 | A1 | 9/2021 | Fellows |
| 2021/0409429 | A1 | 12/2021 | Komashinskiy |
| 2022/0229400 | A1 | 7/2022 | Soler Garrido |
| 2022/0230056 | A1 | 7/2022 | Soler Garrido |
| 2023/0077527 | A1 | 3/2023 | Sarkar |
| 2023/0109398 | A1 | 4/2023 | Kranski |

* cited by examiner

SYSTEMS AND METHODS FOR AUTOMATED MESH SERVICE-BASED DEPLOYMENT INTELLIGENCE

TECHNOLOGICAL FIELD

Example embodiments of the present disclosure relate to systems and methods for automated mesh service-based deployment intelligence.

BACKGROUND

The field of software development, particularly within the operations aspect of the Software Development Life Cycle (SDLC), is encountering increasing challenges in managing the deployment of software artifacts, especially during periods of high deployment volume. These challenges include issues with software deployment dependencies, the need to coordinate with multiple teams, and the necessity to multitask using a variety of tools. Moreover, the deployment process is further complicated by time-dependent approval processes, leading to inefficiencies, errors, and delays that adversely affect software delivery. Despite advancements in automation and orchestration tools, there remains a gap in addressing the specific needs of operations teams. These unmet needs include the complexities in managing software deployment dependencies, early error detection, and the ability to deploy software concurrently across multiple environments.

Current tools in the market, particularly orchestration tools, are limited in their capabilities. They offer low configurational competencies and primitive scheduling options, lacking the necessary support to configure software components' dependencies for deployment. There is also an absence of features to manage deployments on demand and in parallel. Furthermore, these tools do not provide the ability to configure approval workflows at different stages of the deployment process. They are often inflexible in terms of scheduling recurring deployments. This results in inefficiencies, errors, and delays in the deployment process. Additionally, there is a notable lack of mechanisms for self-detecting runtime errors early in the deployment process. These limitations highlight the need for an innovative solution that addresses these specific challenges in software deployment within the SDLC, improving efficiency, accuracy, and the overall speed of software delivery.

As such, Applicant has identified a number of deficiencies and problems associated with automated mesh service-based deployment intelligence. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for automated mesh service-based deployment intelligence. The proposed solution, titled is a groundbreaking system that integrates mesh service architecture capabilities with advanced artificial intelligence (AI). The core of this invention lies in its unique combination of a self-serve distributed engine processor and unique AI application. This approach is designed to autonomously manage deployment dependencies, control dark and live servers, enable self-service scheduling, facilitate parallel processing, and implement self-retry mechanisms. Additionally, it provides the capability for distributed locking and the automatic detection of runtime errors or anomalies during a deployment stage. This system can be accessed and controlled through user-friendly interfaces, either via a direct user interface (UI) or application programming interface (API), making it highly accessible for end users.

The system is engineered to seamlessly integrate with existing orchestration and configuration management tools. This ensures that the adoption of the new system does not disrupt existing workflows and processes within organizations. The architecture underpinning this solution is a testament to its design philosophy, emphasizing scalability, flexibility, and maintainability. These characteristics are crucial for adapting to the evolving needs and complexities of modern software deployment environments.

From a technological standpoint, the solution utilizes a combination of cutting-edge technologies including AI and machine learning, deep learning, mesh service architecture, microservices, Shedlock for distributed locking, along with the use of established orchestration and configuration management tools like Ansible. This amalgamation of technologies ensures that the solution is not only robust and efficient but also at the forefront of innovation in software deployment and management. The system represents a significant step forward in addressing the complexities and challenges of modern software deployment in the SDLC, promising to enhance efficiency, reduce errors, and accelerate the overall software delivery process.

Embodiments of the invention relate to systems, methods, and computer program products for automated mesh service-based deployment intelligence, the invention including: ingest data from multiple data sources including at least one of a monitoring system, a database, and an application performance management tool; store the ingested data in a structured data storage system; process the ingested data to identify deployment patterns and anomalies; apply a machine learning model to the processed data to generate a predicted potential deployment issue; orchestrate deployment of software artifacts based on the predicted potential deployment issue; and optimize a deployment process in real-time to address the predicted potential deployment issue prior to the deployment.

In some embodiments, the invention is further configured to implement a feedback mechanism to refine the machine learning model based on an outcome of a previous deployment.

In some embodiments, the invention is further configured to preprocess the ingested data by normalizing and cleaning the ingested data to conform to a selected format for analysis by the machine learning model.

In some embodiments, the invention is further configured to receive real-time data streams and batch process data inputs from the multiple data sources, enabling synchronous and asynchronous data processing.

In some embodiments, the invention is further configured to employ a service mesh architecture to determine communication between the processing device and deployment services, managing deployment tasks across multiple environments.

In some embodiments, the invention is further configured to utilize a runtime error optimization engine to dynamically adjust deployment strategies based on real-time system states and historical error data.

In some embodiments, the invention is further configured to automatically generate alerts and reports when the machine learning model predicts a high likelihood of deployment failure.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
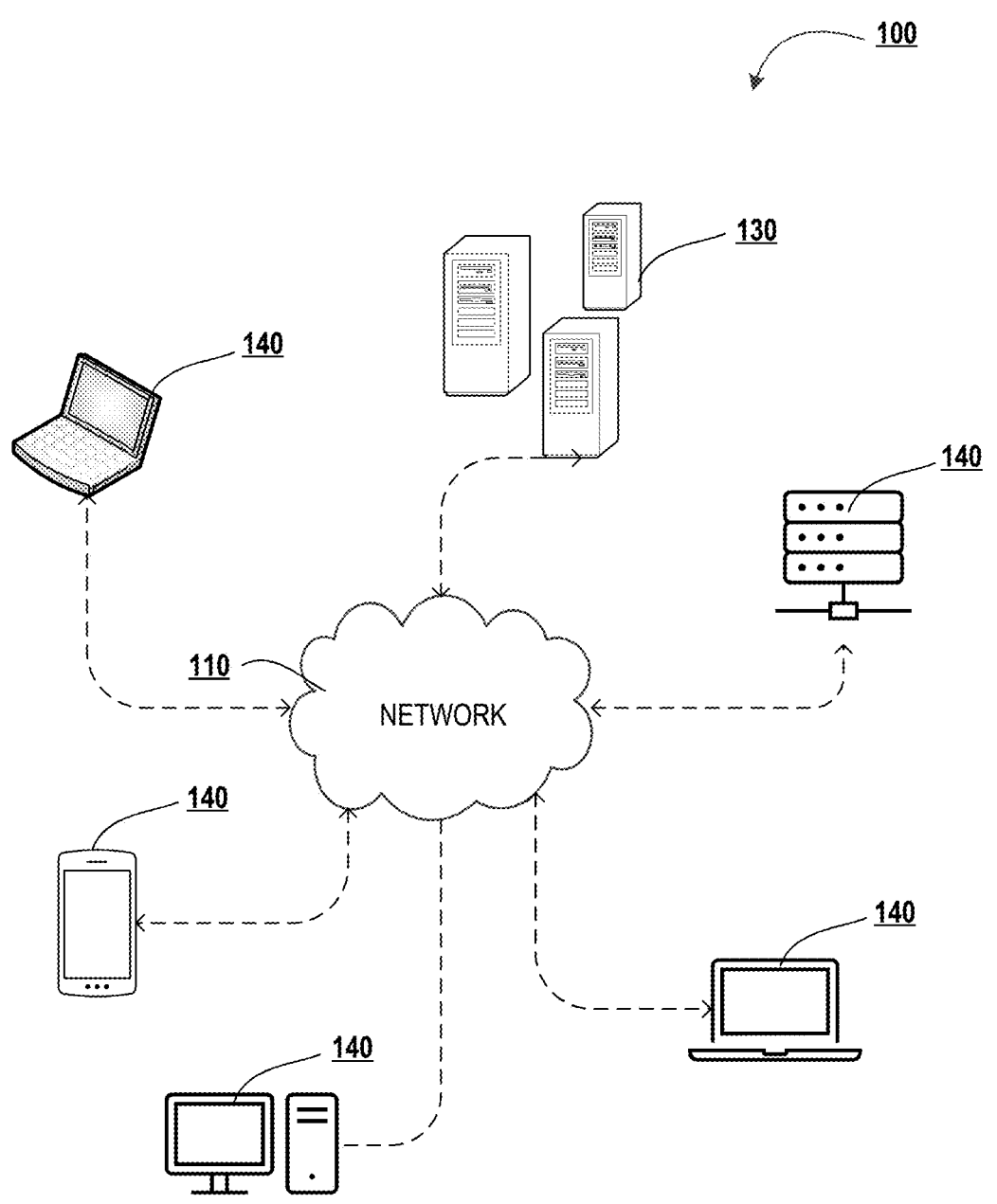
Figure 1B:
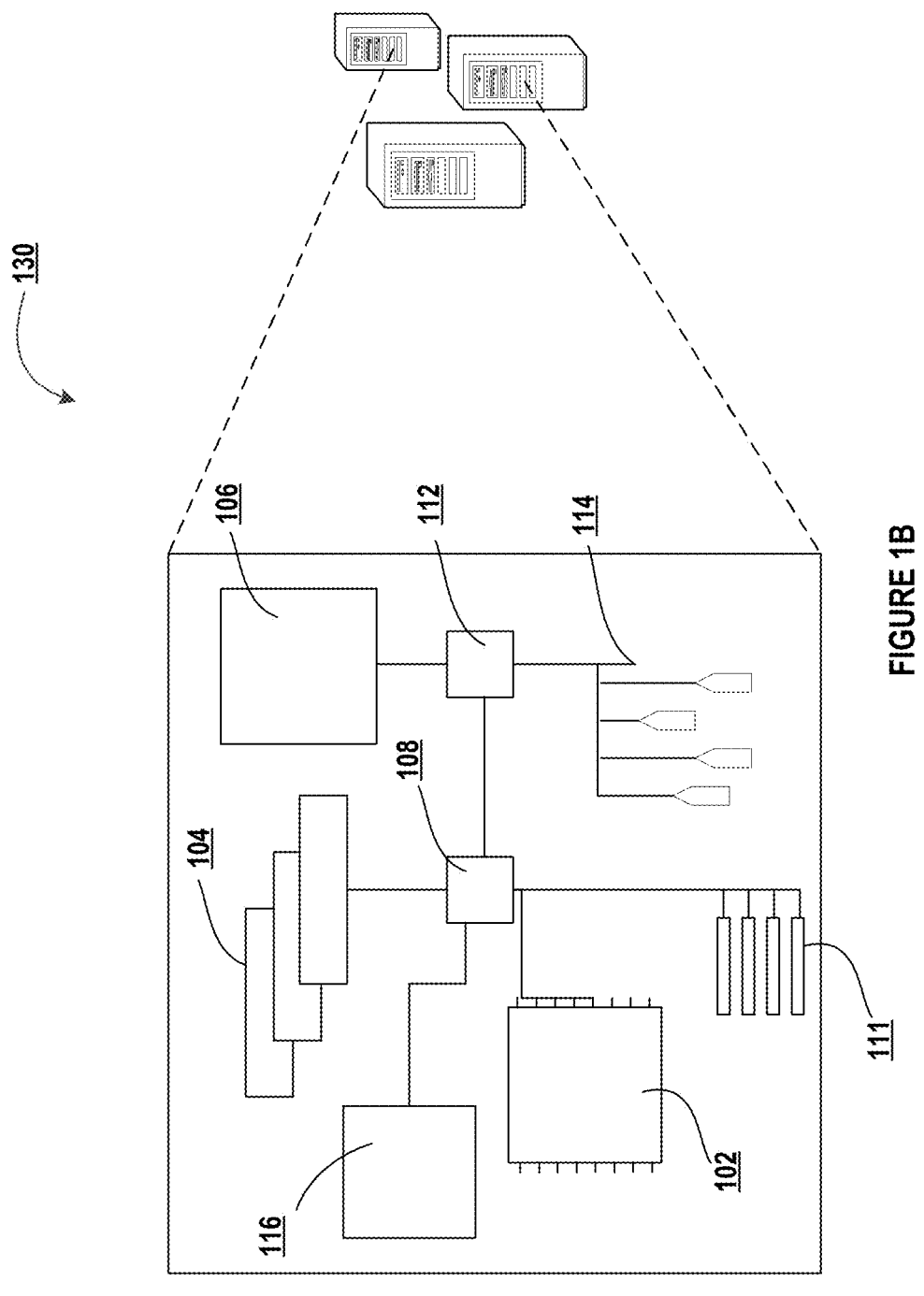
Figure 1C:
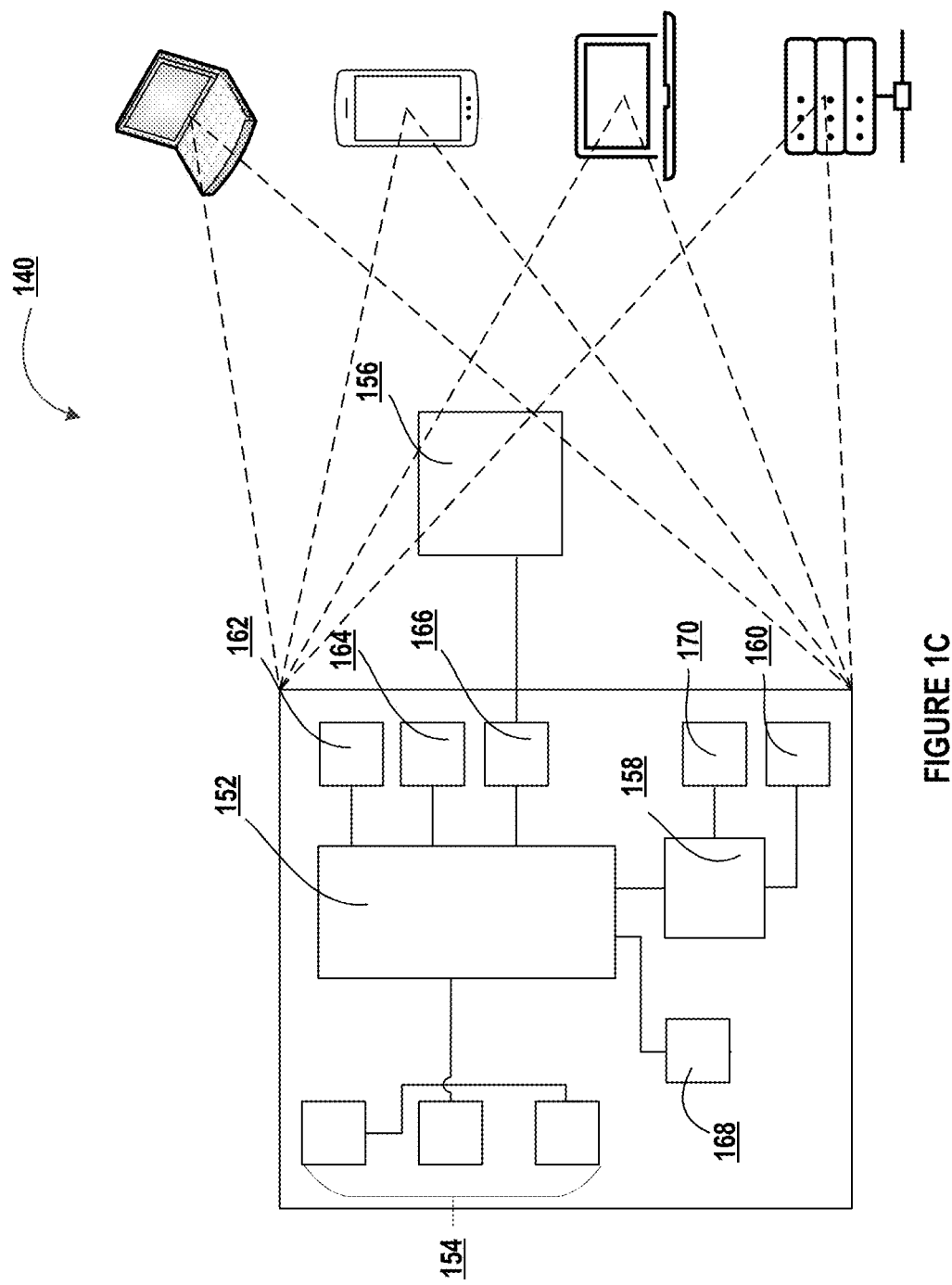
Figure 2:
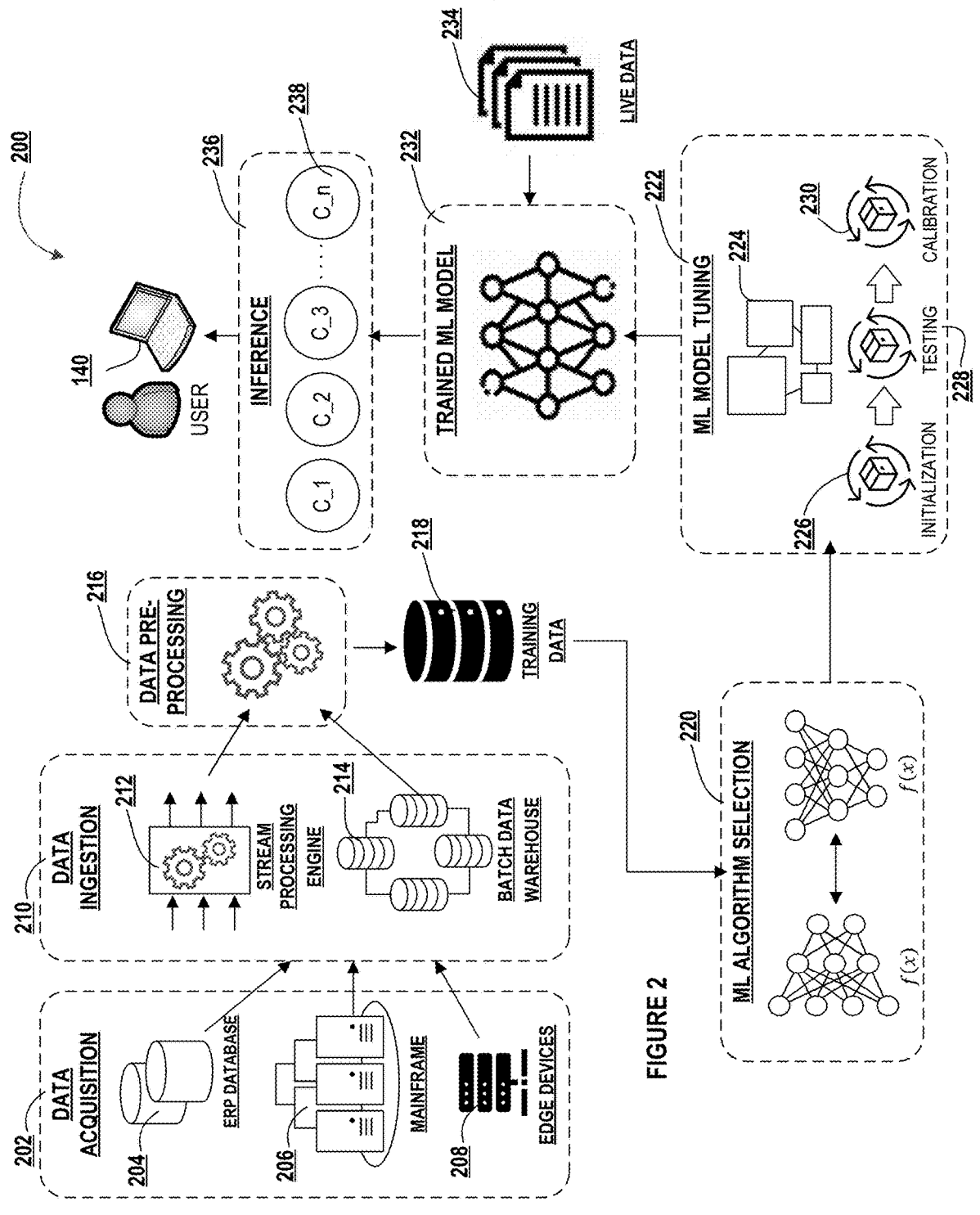
Figure 3:
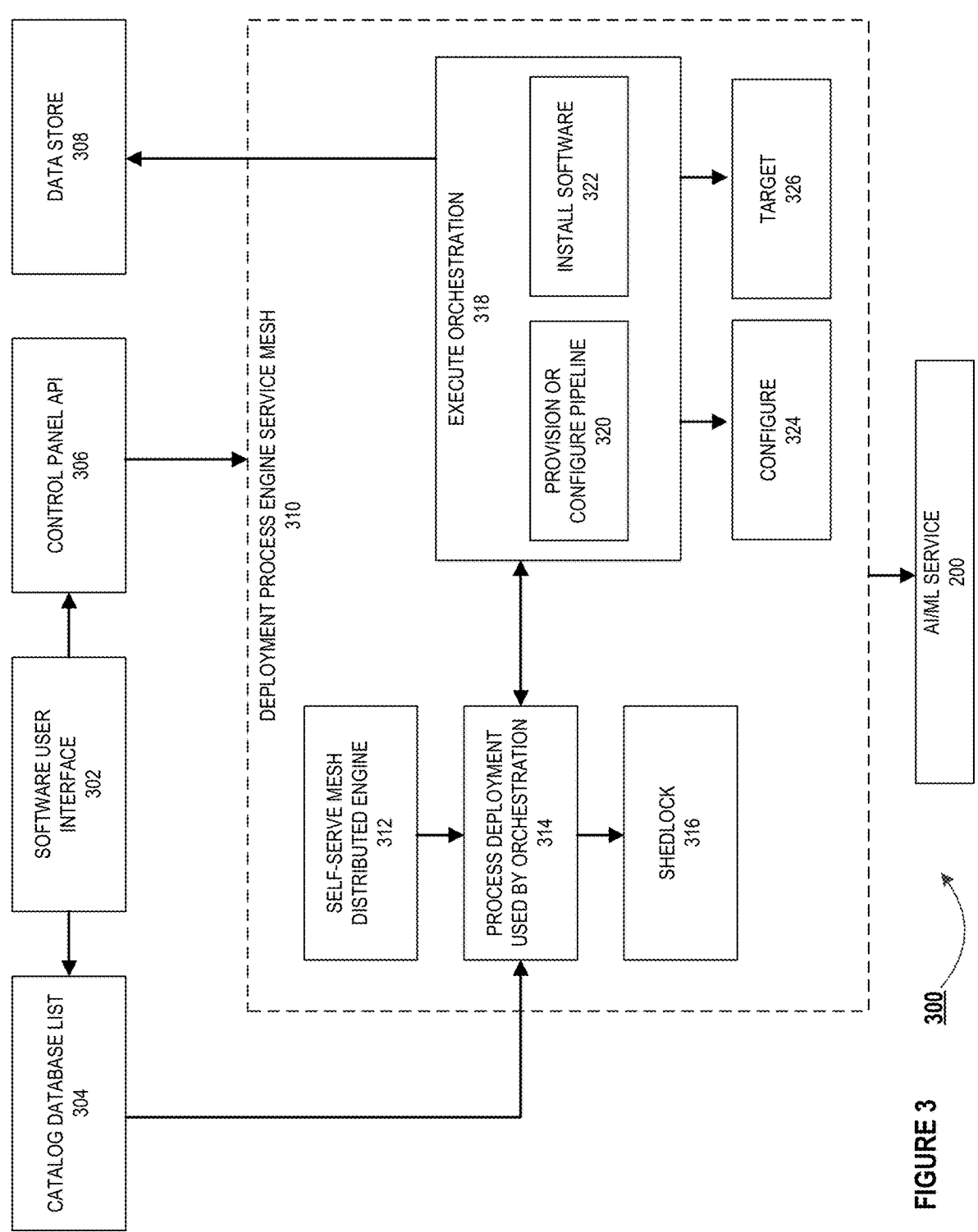
Figure 4A:
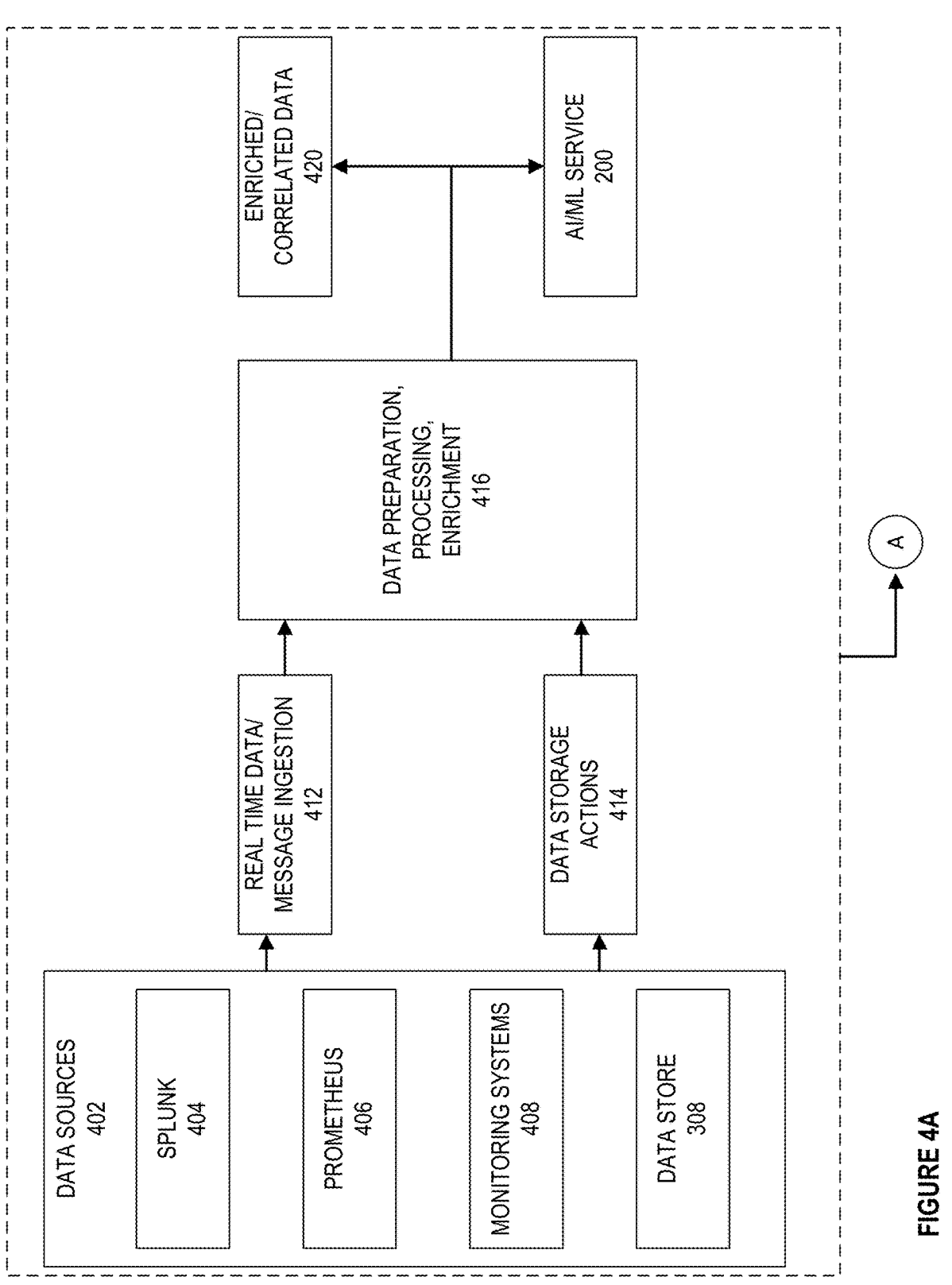
Figure 4B:
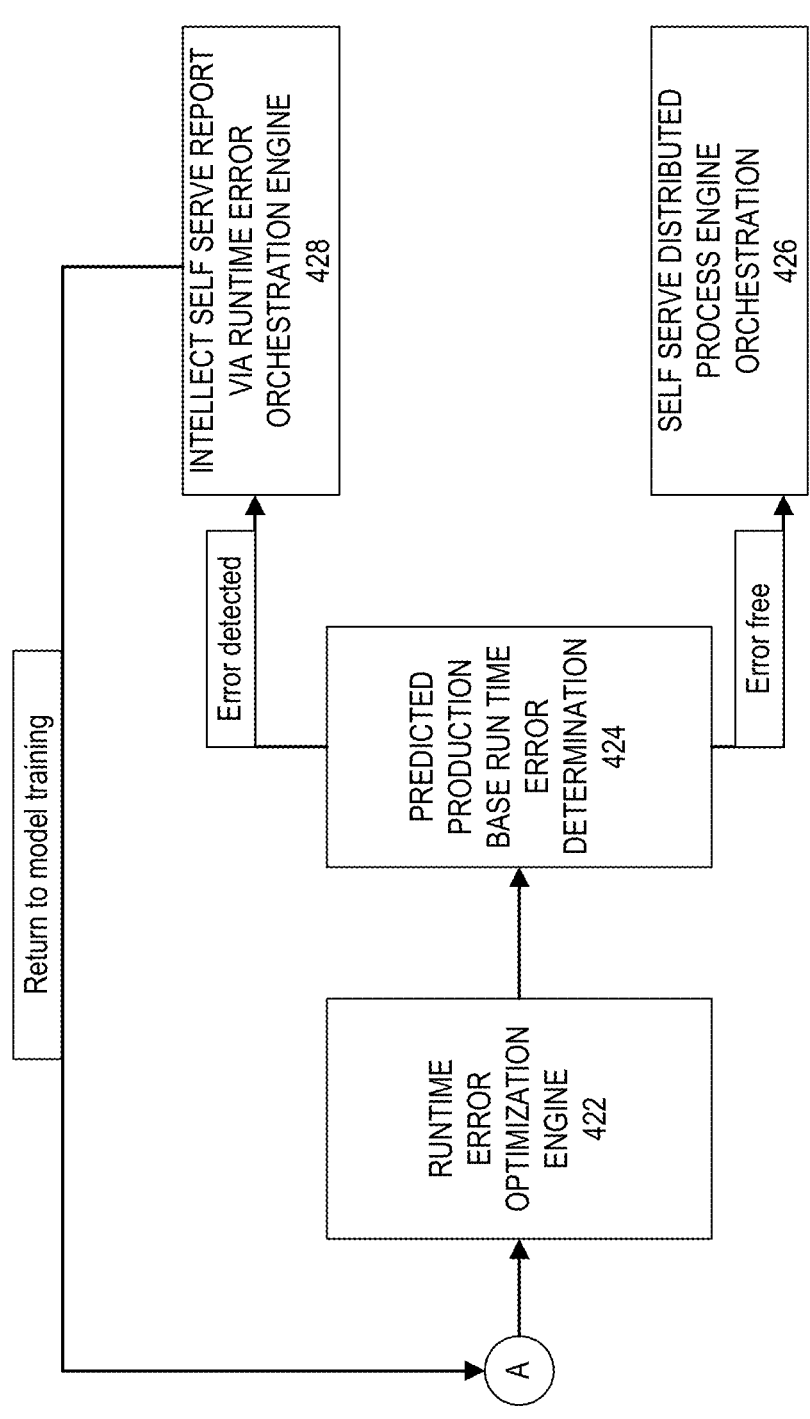

FIGS. 1A-1C illustrates technical components of an exemplary distributed computing environment for automated mesh service-based deployment intelligence, in accordance with an embodiment of the disclosure; and FIG. 2 illustrates an exemplary machine learning (ML) subsystem architecture 200 for automated mesh service-based deployment intelligence, in accordance with an embodiment of the invention;

FIG. 3 illustrates a high-level process flow 300 for automated mesh service-based deployment intelligence, in accordance with an embodiment of the invention; and FIG. 4A and FIG. 4B illustrate the intricacies of a sophisticated data processing and machine learning system designed to optimize and automate the deployment of software applications, in accordance with an embodiment of the invention.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "machine learning," pertains to the spectrum of computational techniques and methodologies that enable computer systems to improve their performance on a given task with experience over time. It involves the design and development of algorithms that can learn from and make predictions or decisions based on data. These algorithms are capable of performing a range of activities traditionally requiring human cognition, such as recognizing patterns, making decisions, and predicting future events. Machine Learning encompasses subdomains such as supervised learning, where the algorithm learns from labeled training data, unsupervised learning, where the algorithm identifies patterns in data, and reinforcement learning, where program learns to make decisions by taking actions in an environment to achieve rewards.

As used herein, "artificial intelligence," embodies the broader discipline within computer science that aims to replicate or simulate human intelligence in machines. The term is commonly applied to the project of developing systems endowed with the intellectual processes characteristic of humans, such as the ability to reason, discover meaning, generalize, or learn from past experiences. AI includes both symbolic approaches, like knowledge representation and logical inference, and sub-symbolic approaches, such as the use of neural networks and evolutionary algorithms. AI systems are employed in fields as diverse as computer science, finance, and robotics, and are increasingly being used to perform tasks that typically require human intelligence, including visual perception, speech recognition, decision-making, and language translation.

"Orchestration," as utilized in the present context, is indicative of the systematic automation and coordination of computer systems and software. This process is integral to the architecture of modern computing environments, which often consist of complex, interconnected services. Orchestration streamlines the configuration, management, and coordination of these services, ensuring that they interact with each other in an orderly and efficient manner. The term also relates to the dynamic management of workflows and processes within an IT and business context, enabling the automated execution of various tasks that would otherwise require manual intervention. In a software deployment and operations context, orchestration is critical for managing the lifecycle of applications across multiple environments, from development through production.

"Data ingestion," in the present invention, denotes the foundational process of transporting data from a variety of sources into a system where it can be stored, processed, and analyzed. It is a critical first step in the data processing pipeline, especially in environments that rely on large volumes of data from disparate sources. This process can occur in real-time or in batches and may involve different protocols and methods depending on the nature of the data and its source. Once ingested, the data may be stored in databases, data lakes, or warehouses, where it becomes accessible for further operations such as analysis, processing, or reporting. Data ingestion is a key enabler for data-driven decision-making, providing the raw material that fuels the analytics engines of an organization.

It is understood that "error optimization" refers to the iterative process of reducing the frequency and severity of errors within a system. It encompasses the identification, analysis, and implementation of corrective measures aimed at mitigating or eliminating the root causes of errors. This process often involves predictive analytics, where machine learning models anticipate and prevent errors before they manifest, and root cause analysis, which aims to determine the underlying reasons for errors that have occurred. In complex software systems, error optimization is a crucial activity that enhances system reliability and maintains operational integrity, ensuring that software deployments and runtime operations are executed with minimal disruptions.

"Enrichment" in data processing is characterized by the enhancement of raw data with additional context, improving its usefulness and value for analysis. This process typically involves augmenting the dataset with supplementary information that may not be present within the initial data capture. By integrating data from various sources, enrichment processes enable a more nuanced and comprehensive view of the dataset, facilitating deeper insights and more accurate decision-making. Data enrichment is particularly valuable in scenarios where the raw data, while extensive, lacks the specificity or context needed to inform critical business or operational decisions. Through enrichment, organizations can transform basic data points into actionable intelligence.

The technology in question leverages advanced mesh service architectures and integrates artificial intelligence and machine learning algorithms to revolutionize the process of software deployment in the field of software development. By utilizing a blend of these cutting-edge technologies, the system offers a more sophisticated, automated, and intelligent approach to managing and deploying software artifacts. In the realm of software development, operation teams frequently encounter challenges in managing high volumes of deployment requests. These challenges include dealing with complex software deployment dependencies, coordinating multiple teams, utilizing various tools, and navigating time-dependent approval processes. These issues often lead to inefficiencies, errors, and delays in software delivery, hindering the overall process despite advancements in automation and orchestration tools. The solution, in layperson's terms, is akin to having a highly intelligent 'autopilot' system for software deployment. This system, empowered by AI, takes over the complex task of managing software deployments. It can intelligently handle dependencies, schedule deployments, and detect errors early in the process, all while operating across multiple environments. This makes the deployment process smoother, faster, and less prone to human error.

Accordingly, the present disclosure encompasses a self serve distributed engine processor combined with AI to auto-manage deployment dependencies, control server states, and facilitate self-scheduling and parallel processing. It includes distributed locking and automatic detection of runtime errors or anomalies during the deployment stage, all accessible via a user-friendly UI/API. This system is designed to seamlessly integrate with existing orchestration and configuration management tools, ensuring an enhancement rather than disruption of current workflows. What is more, the present disclosure provides a technical solution to a technical problem. The technical problem includes managing complex software deployment processes, particularly in high-volume, multi-environment contexts. The technical solution presented allows for streamlined, automated management of these processes, significantly reducing the need for manual intervention and minimizing errors. In particular, this solution is an improvement over existing solutions to the software deployment problem, (i) with fewer steps to achieve the solution, thus reducing the use of computing resources, (ii) providing a more accurate solution to the problem, thus reducing the resources required for error correction, (iii) eliminating manual input and waste, thus enhancing process speed and efficiency, and (iv) optimizing resource utilization, thereby reducing network traffic and load on computing resources. Furthermore, the technical solution described uses a rigorous, computerized process to perform specific tasks that were not previously automated. In specific implementations, this solution bypasses a series of steps previously implemented, conserving computing resources even further.

FIGS. 1A-1C illustrate technical components of an exemplary distributed computing environment 100 for automated mesh service-based deployment intelligence, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer—or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 .... C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 .... C_n 238) live data 234 based on how similar they are to one another to solve exploratory challenges where little is known about the data, provide a description or label (e.g., C_1, C_2 .... C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It is understood that the machine learning subsystem is an integral component of the present invention, designed to enhance the software deployment process through intelligent automation. In the context of the present invention, the machine learning subsystem utilizes a series of interconnected engines, each specializing in a different aspect of data handling and model management, which collectively serve to optimize and streamline the deployment process.

The first stage in the machine learning pipeline involves the data acquisition engine. In this invention, it plays a crucial role in identifying and retrieving a diverse array of data from various sources. These sources can range from internal databases that track software deployment activities to external streams of data that may affect software deployment, such as network traffic patterns or system performance metrics. The acquired data is vast and varied, necessitating the use of complex network protocols and APIs for efficient and secure data transport. This data forms the foundation upon which the ML model will learn and make informed decisions. By collecting data from sources such as ERP systems, mainframes, and edge devices, the machine learning subsystem gains a comprehensive view of the deployment landscape, which is vital for the subsequent stages of data processing and model training.

The data ingestion engine plays a pivotal role in the machine learning subsystem of the present invention, transforming a multitude of data types into a standardized format amenable for analysis and further processing. This engine is engineered to seamlessly handle and assimilate disparate data sources, ranging from structured data such as SQL database extracts to unstructured data including log files, real-time stream data from application programming interfaces (APIs), and Internet of Things (IoT) sensor readings. The standardization process involves multiple technical steps which ensure that the data, regardless of its origin, is homogenized into a consistent format that can be efficiently processed by the subsequent stages of the machine learning pipeline.

As an exemplary embodiment, one of ordinary skill may consider the deployment process for a complex software application involving various data types such as configuration files in XML format, user activity logs in JSON format, real-time performance metrics streamed via a Kafka cluster, and batch-loaded historical operational data in CSV files. The data ingestion engine first initiates parsers for each data type, converting them into a uniform JSON format which serves as the lingua franca for internal data processing. For instance, XML and CSV parsers translate the elements and values of these files into key-value pairs in JSON objects, while log files are ingested using customized regular expressions that extract relevant information structured into JSON format.

Following the parsing process, the engine employs schema mapping techniques where the JSON objects from each data type are aligned to a schema that dictates the structure and data types expected for each field in the system. This schema acts as a template to ensure that all incoming data conforms to the expected structure, facilitating compatibility and interoperability between different datasets. For real-time data streams, the stream processing engine utilizes a complex event processing (CEP) system that filters, aggregates, and transforms the data as it arrives. It employs a combination of windowing functions to group data points over a specified time or event frame and apply transformations that reduce noise, fill in missing values, and resolve any temporal inconsistencies.

Batch processing, utilized for less time-sensitive data, involves staging the data in a data lake or warehouse. The engine applies extract, transform, and load (ETL) operations in scheduled intervals, ensuring that large datasets are digested into the system without overwhelming the processing capabilities. Transformation logic in this phase includes normalization, deduplication, and indexing to optimize the data for rapid retrieval and analysis. The standardized data, now homogenized and schema-conformant, is queued for ingestion into the data pre-processing engine. At this juncture, the data is further refined and enriched-numerical values are normalized to a consistent scale, categorical variables are encoded using one-hot encoding or similar techniques, and any remaining data anomalies are addressed through outlier detection and imputation algorithms. This meticulous process of data standardization ensures that individuals skilled in the art can replicate and practice the embodiment. It provides a clear pathway for data handling that is essential for the next steps in the machine learning subsystem, such as feature extraction, model training, and inference generation, ultimately leading to intelligent and automated software deployment decisions.

Following ingestion, the data pre-processing engine addresses one of the most significant challenges in machine learning: ensuring the quality and usability of data. In the deployment intelligence context, this involves cleaning the data, handling missing values, and resolving inconsistencies, which are common issues given the diverse data sources involved. Moreover, this engine is tasked with feature extraction and selection, processes that reduce the dimensionality of the data and distill it into the most relevant attributes for the ML model to learn from. This not only improves the efficiency of the model by reducing computational load but also enhances the model's performance by focusing on the most impactful data features. For instance, in a deployment scenario, features such as the frequency of deployment failures, the average time to recover from an incident, or the correlation between deployment timings and system load could be extracted to inform the deployment strategy.

At the core of the machine learning subsystem, the ML model tuning engine acts as the central mechanism where raw data is transmuted into actionable intelligence. This engine is tasked with employing the processed and feature-rich training data to craft and refine a plethora of machine learning models suited for various aspects of the software deployment process. The journey from theoretical models to practical deployment tools is marked by extensive experimentation, where diverse algorithms are rigorously tested against deployment scenarios simulated from historical data. This simulation not only assesses algorithmic efficacy but also ensures that the models can withstand the multifaceted nature of live software deployment environments.

The hyperparameters of each algorithm undergo a thorough optimization process. This is a methodical exercise involving grid search, random search, or Bayesian optimization techniques to explore the hyperparameter space. For instance, when tuning a random forest algorithm, the engine methodically adjusts hyperparameters such as the number of trees, maximum depth of trees, and the minimum number of samples required to split a node. The aim is to forge a model that not only excels in predicting and facilitating various software deployment tasks but also operates within the computational budgets allocated, thus epitomizing efficiency. Such hyperparameter tuning is pivotal in achieving a harmonious balance between precision and speed, essential for real-time deployment decisions.

The culminating phase of the machine learning pipeline is embodied by the inference engine, a sophisticated module where the trained models are put into action. The transition from training to inference marks a critical phase where theoretical knowledge is applied to live data streams, enabling the system to enact real-time decisions that navigate the complex landscape of software deployment. The inference engine leverages the model's learned patterns to discern the most efficient pathways for deploying software, akin to a skilled conductor orchestrating a symphony of digital elements.

Depending on the specific deployment objectives and the nature of the incoming data, the inference engine utilizes the model's capabilities to categorize and prioritize deployment tasks, forecast the most opportune moments for deployment to avoid peak load times, or preemptively identify and resolve conflicts that could jeopardize deployment success. This level of anticipatory action is made possible by the engine's ability to apply the model's predictive power to the current state of the deployment environment, effectively providing a foresight-driven approach to deployment management. As a result, the system not only elevates the efficacy of the deployment process but also significantly alleviates the burden on operations teams, ensuring a seamless transition from code completion to live environment deployment with minimal manual oversight. This proactive stance championed by the inference engine is the cornerstone of the system's value proposition, ensuring that software deployment is not only successful but also efficient and resilient to the dynamic demands of modern software delivery practices.

The machine learning subsystem is, therefore, not just a static component but a dynamic and evolving part of the deployment intelligence system, continually learning and improving from each deployment scenario. This constant evolution is critical to maintaining the effectiveness of the system in a rapidly changing software deployment environment.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a high-level process flow 300 for automated mesh service-based deployment intelligence, in accordance with an embodiment of the invention. The process begins with the software user interface 302, where users interact with the system to initiate and manage the deployment of software artifacts. This interface is designed to be user-friendly, allowing for seamless navigation through deployment options and configurations. In some embodiments of the deployment intelligence system, the software user interface (UI) 302 is meticulously engineered to provide a seamless and intuitive user experience. In some embodiments it is constructed using a responsive web design framework, such as Angular or React, ensuring compatibility across a wide range of devices and screen sizes. This UI may be connected to a backend server via RESTful APIs, which communicate in JSON format, offering a smooth and efficient exchange of information.

The UI may be designed, in some embodiments, with a dashboard that presents a holistic view of the deployment ecosystem, including real-time status indicators, logs, and controls for initiating and managing deployments. It may feature drag-and-drop functionality, enabled by HTML5 and advanced JavaScript libraries, for configuring deployment pipelines and setting up deployment tasks. Advanced features like auto-complete and context-sensitive help may be incorporated to assist users in making decisions about deployment strategies and configurations.

Next is the control panel API 306, which serves as an intermediary between the software user interface 302 and the various components of the system. One of ordinary skill with appreciate that the software user interface 302 processes user requests and translates them into actions that can be understood and executed by the underlying technologies. In some embodiments, the control panel API 306, implemented using Node.js or ASP.NET Core, acts as a conduit for all communications between the UI and the system's backend services. As such, it may authenticate user actions, authorize access levels, and translate user commands into service-specific calls. In some embodiments, the API employs OAuth for secure authentication and JSON Web Tokens (JWT) for maintaining session state across the stateless HTTP protocol.

Moving further through the process flow 300, it is understood that the data store 308 acts as a repository for all data relevant to the deployment processes, including configurations, user data, and deployment logs. It ensures that all necessary information is readily available for retrieval and manipulation throughout the deployment cycle. Additionally, the catalog database list 304 is a structured listing of all the software artifacts that are available for deployment. This comprehensive catalog enables the system to track dependencies and versions, ensuring that the correct artifacts are deployed in the correct order.

Central to the workflow FIG. 3 is self-serve mesh distributed engine 312, which exemplifies the convergence of automation and intelligence within the deployment ecosystem. This sophisticated engine is architected atop a service mesh framework (e.g., Istio, or the like), selected for advanced capabilities in transparently managing service-to-service communication within the deployment process. The service mesh serves as the foundation upon which the self-serve engine orchestrates a variety of deployment tasks, each critical to the fluid operation of the system.

The engine is composed of a suite of functionalities that together facilitate a seamless deployment process. It includes a service discovery mechanism, which is integrated with tools to automatically detect services as they become available, thereby maintaining an up-to-date registry of resources within the deployment landscape. Configuration management is handled through services which distribute and synchronize configuration data across services, ensuring consistency and compliance with the defined deployment parameters. In some embodiments, traffic management is conducted via the service mesh ingress and egress controllers, which are configured to manage traffic flow, enabling sophisticated deployment strategies such as A/B testing, canary releases, and blue-green deployments.

To ensure the security of communications within the deployment process, the engine leverages the service mesh's ability to enforce mutual TLS, ensuring encrypted and authenticated traffic between services. In tandem with this, authentication protocols are integrated to manage access and maintain security at the service level. The engine also incorporates the service mesh's observability tools, utilizing built-in monitoring capabilities to provide real-time telemetry, logging, and tracing, thus offering a granular view into the health and performance of the deployment process. The resilience of the deployment process is further enhanced by the engine's capability for fault injection, which allows for the simulation of failures within a controlled environment, ensuring that the system is robust and capable to handle potential disruptions. This is achieved by employing the service mesh's fault injection features, which are designed to test and improve the resilience of the services.

One of ordinary skill will appreciate that for the deployment of a service mesh platform, a focus on configuring its control plane to seamlessly integrate with the existing infrastructure is required. Custom controllers, or the adaptation of existing ones within the service mesh, are developed to meet the unique demands of the deployment process, including traffic routing and resilience patterns. Service discovery mechanisms are employed to dynamically handle the registration and deregistration of services, while configuration management processes are instituted to ensure dynamic and consistent configuration across the deployment landscape. Traffic management policies are established to control request flows during deployment, ensuring uninterrupted service delivery. Security measures are adopted, with strict protocols set in place for inter-service communication, safeguarded by mutual TLS and robust authentication practices. The integration of observability tools into the deployment process is essential, enabling continuous monitoring and the collection of insightful telemetry data. Finally, fault injection experiments are designed and executed to validate and reinforce the deployment process against adverse conditions, assuring the system's ability to maintain operational integrity under various scenarios.

The process deployment used by orchestration 314 is a subsystem that integrates with existing orchestration tools. It utilizes the defined deployment processes to coordinate the various stages of deployment, ensuring that all steps are executed in the right sequence and without conflicts. One of ordinary skill in the art will appreciate that the orchestration process deployment 314 serves as an integral subsystem within the present invention's architecture, interfacing cohesively with a suite of established orchestration tools. This subsystem is adeptly engineered to harness the defined deployment processes, meticulously guiding each phase of the deployment lifecycle. It ensures that every step, from initial code check-ins to the final release, adheres to a sequence, thereby upholding the integrity of the deployment pipeline. To achieve this, the subsystem employs a sophisticated coordination mechanism that not only orchestrates the timing and order of deployment actions but also preemptively identifies and resolves potential conflicts that could disrupt the deployment flow.

This orchestration process deployment 314 is built to be agnostic to the specific orchestration tools in use, allowing for a broad compatibility with industry-standard solutions such as Jenkins, Ansible, or Kubernetes. It acts as an intermediary layer that translates the unique requirements of the self-serve mesh distributed engine 312 into actionable tasks that these orchestration tools can understand and execute. The subsystem leverages APIs provided by these tools to trigger and manage deployments, apply configuration changes, and monitor the state of each deployment task. It is understood that the system is designed to seamlessly integrate with existing orchestration and configuration management tools, ensuring an enhancement rather than disruption of current workflows, and these tools may be referred to herein as application performance management tools. It is understood that the system may ingest data from multiple sources, including the application performance management tools, monitoring systems, databases, or the like.

Furthermore, it is designed with extensibility in mind, allowing for custom integrations with additional tools and systems as needed. The technical steps involved in this process include the establishment of API connectors that facilitate communication between the self-serve mesh distributed engine and the orchestration tools. Furthermore, the subsystem incorporates event-driven triggers, which are configured to respond to changes in the deployment environment automatically. These triggers initiate predefined workflows within the orchestration tools, which then carry out the necessary deployment actions.

The orchestration process deployment 314 also includes a conflict resolution protocol that operates on the principles of concurrency control and dependency management. This protocol ensures that deployment actions do not interfere with one another and that dependencies between software components are respected, thereby preventing deployment failures due to resource contention or order-of-operation errors. By integrating these technical elements, the subsystem provides a robust framework that streamlines the deployment process, ensuring that deployments are performed consistently, efficiently, and without error.

The Shedlock 316 is a specialized mechanism embedded within the deployment process to safeguard against the execution of concurrent processes that could potentially lead to deployment conflicts. This mechanism is strategically designed to maintain a system-wide lock for specific deployment processes, ensuring that no duplicate execution occurs even if parallel requests for the same process are initiated. By doing so, Shedlock 316 is instrumental in preserving the atomicity and consistency of the deployment operations, which is fundamental in mitigating errors and ensuring a stable deployment environment. It acts as a gatekeeper, employing a locking protocol that uniquely identifies each deployment process and monitors its state across the system. Should simultaneous requests arise, the Shedlock 316 determines the priority and permits only a single instance to proceed, queuing or rejecting subsequent attempts based on predefined rules and logic.

Execute orchestration 318 represents the dynamic and operational center of the deployment process. During this phase, the orchestrated sequence of deployment tasks is activated, encompassing a broad spectrum of operations critical to the deployment's success. It orchestrates various tasks, including the provisioning of necessary infrastructure resources, such as server instances or storage, and the execution of deployment scripts that install or update software components. This stage is where the planned deployment strategy is translated into practical execution, where scripts and automation tools are leveraged to carry out the deployment commands as dictated by the process deployment used by orchestration 314. The execute orchestration 318 functions under the orchestration framework's guidance, which, depending on the embodiment of the invention, may be any of the leading tools in the industry, ensuring that each step of the deployment is performed with precision and aligns with the overarching deployment plan. It is here that the software artifacts are deployed to their respective environments, configuration changes are applied, and the entire system is brought to its desired state, ready for operation or further testing.

Provision or configure pipeline 320 refers to the setup of the deployment pipeline, which may involve provisioning necessary resources and setting up the environment for software deployment. This step ensures that the infrastructure is prepared for the software that will be installed. It is understood that install software 322 represents the actual deployment of the software artifacts into the target environment. This step is where the software becomes operational within the system.

Configure 324 pertains to the adjustments and fine-tuning of the software and environment after installation. This can include configuration of software settings, environmental variables, and other parameters essential for optimal software performance. The configure phase 324 is an essential part of the deployment process, where the customization and optimization of the software environment take place post-installation. This phase involves a meticulous adjustment of various settings and parameters to align the software's operation with the specific requirements of the target environment. It is during this phase that system administrators and deployment engineers fine-tune the software settings, such as memory allocations, timeout settings, and feature flags, to ensure that the software performs optimally in its new environment.

In addition to software settings, configure 324 also involves the setting of environmental variables that are critical for the software's interaction with its operating environment. These variables can dictate the software's runtime behavior, influence its access to system resources, and enable it to adapt to different environments, from development and testing stages to production. The configure phase also entails the adjustment of other parameters, which may include network configurations, security settings, database connections, and integration points with other systems or services. This ensures that the software not only performs efficiently but also maintains the necessary security standards and interoperability with other components within the system's architecture.

It is understood that scripts and automation tools are often utilized to apply these configurations systematically, and validation processes are put in place to confirm that the adjustments have been successfully applied and that the software is functioning as intended within its deployment context. Finally, target 326 indicates the destination environments for the deployed software, which could range from development and testing environments to staging and production. This ensures that the correct version of the software is deployed in the appropriate environment, in accordance with the deployment strategy. This high-level process flow 300 is underpinned by an AI/ML Service 200, which provides intelligent insights and decision-making capabilities throughout the deployment process. The AI/ML Service uses machine learning models and algorithms to optimize deployment strategies, predict and prevent errors, and enhance overall deployment efficiency, as outlined in FIG. 2.

FIG. 4A and FIG. 4B illustrate the intricacies of a sophisticated data processing and machine learning system designed to optimize and automate the deployment of software applications, in accordance with an embodiment of the invention. The process flows depicted in these figures encapsulate the process from raw data acquisition to intelligent decision-making and orchestration. FIG. 4A outlines the initial stages of the process flow.

Data begins at the data sources 402, which include Splunk 404, Prometheus (406), monitoring systems 408, and the data store 410. One of ordinary skill will appreciate that Splunk and Prometheus are advanced monitoring and analytics platforms that gather operational intelligence. The monitoring systems collectively represent a variety of tools that track and record the performance and health of different components within an IT ecosystem. The data store is the foundational database or data warehouse where historical and operational data is housed.

From these data sources, information flows into the real-time data/message ingestion component 412, which is responsible for capturing and consolidating data streams in real-time. This is crucial for enabling immediate analysis and responsiveness to current system states. Data then moves to the data storage actions component 414, which signifies the storage solutions in place to handle the voluminous data ingested. These actions could involve writing to databases, data lakes, or other forms of persistent storage, ensuring data durability and accessibility for downstream processing. Next, data preparation, processing, and enrichment 416 take place. This stage involves cleansing, normalizing, and transforming the data into a format suitable for analysis. Enrichment processes augment the data with additional context, possibly from other data sources, to provide a richer dataset for the machine learning models.

The enriched and correlated data 420 is the output from the previous stage, now ready for advanced analytics. This data is characterized by the added value derived from the enrichment process, which correlates different data points to reveal insights that were not apparent before. Finally, the AI/ML service 200 is utilized such that artificial intelligence and machine learning algorithms are applied to the enriched data. Here, models are trained, evaluated, and deployed to predict outcomes, detect patterns, and inform decision-making processes, as further outlined in FIG. 2.

FIG. 4B presents the subsequent stages, focusing on error optimization and orchestration. The Runtime Error Optimization Engine 422 is a specialized component that takes the outputs from the AI/ML service 200 and applies algorithms designed to detect, analyze, and optimize away runtime errors. This could involve techniques like anomaly detection, root cause analysis, and predictive maintenance to preemptively address potential issues. When the Predicted Production Base Run Time Error Determination 424 identifies a runtime error, it triggers the Runtime Error Orchestration Engine 428. This engine coordinates the response to runtime errors, which could involve alerting operators, triggering automated recovery processes, or providing detailed diagnostics.

In contrast, when the process flows without errors, the Self Serve Distributed Process Engine Orchestration 426 takes over. This component is the culmination of the process flow, where the insights gained from the AI/ML service are translated into actionable deployment strategies. It automates the deployment process, utilizing self-service capabilities that allow users to initiate, manage, and monitor deployments without the need for deep technical expertise. The two-way arrow between the Runtime Error Optimization Engine 422 and the AI/ML service 200 represents a feedback loop where information about runtime errors is used to continuously refine the machine learning models, ensuring that the system learns from past incidents and becomes progressively smarter over time. Together, FIGS. 4A and 4B encapsulate a complete closed-loop system that not only automates software deployment but also self-optimizes to reduce errors and improve efficiency. This sophisticated data flow and processing architecture enable organizations to leverage big data and machine learning for proactive and intelligent software management.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for automated mesh service-based deployment intelligence, the system comprising:
a memory containing instructions when executed by the system, causes the system to perform the steps of:
ingesting data from multiple data sources including at least one of a monitoring system, a database, and an application performance management tool;
storing the ingested data in a structured data storage system;
processing the ingested data to identify deployment patterns and anomalies;
applying a machine learning model to the processed data to generate a predicted potential deployment issue;
orchestrating deployment of software artifacts based on the predicted potential deployment issue; and
optimizing a deployment process in real-time to address the predicted potential deployment issue prior to the deployment.

2. The system of claim 1, wherein the system is further configured to implement a feedback mechanism to refine the machine learning model based on an outcome of a previous deployment.

3. The system of claim 1, wherein the system is further configured to preprocess the ingested data by normalizing and cleaning the ingested data to conform to a selected format for analysis by the machine learning model.

4. The system of claim 1, wherein the system is further configured to receive real-time data streams and batch process data inputs from the multiple data sources, enabling synchronous and asynchronous data processing.

5. The system of claim 1, wherein the system is further configured to employ a service mesh architecture to determine communication with deployment services, managing deployment tasks across multiple environments.

6. The system of claim 1, wherein the system is further configured to utilize a runtime error optimization engine to dynamically adjust deployment strategies based on real-time system states and historical error data.

7. The system of claim 1, wherein the system is further configured to automatically generate alerts and reports when the machine learning model predicts a deployment failure.

8. A computer program product for automated mesh service-based deployment intelligence, the computer program product comprising a non-transitory computer-readable medium comprising code causing an apparatus to:
ingest data from multiple data sources including at least one of a monitoring system, a database, and an application performance management tool;
store the ingested data in a structured data storage system;
process the ingested data to identify deployment patterns and anomalies;
apply a machine learning model to the processed data to generate a predicted potential deployment issue;
orchestrate deployment of software artifacts based on the predicted potential deployment issue; and
optimize a deployment process in real-time to address the predicted potential deployment issue prior to the deployment.

9. The computer program product of claim 8, wherein the code further causes the apparatus to: implement a feedback mechanism to refine the machine learning model based on an outcome of a previous deployment.

10. The computer program product of claim 8, wherein the code further causes the apparatus to: preprocess the ingested data by normalizing and cleaning the ingested data to conform to a selected format for analysis by the machine learning model.

11. The computer program product of claim 8, wherein the code further causes the apparatus to: receive real-time data streams and batch process data inputs from the multiple data sources, enabling synchronous and asynchronous data processing.

12. The computer program product of claim 8, wherein the code further causes the apparatus to: employ a service mesh architecture to determine communication with deployment services, managing deployment tasks across multiple environments.

13. The computer program product of claim 8, wherein the code further causes the apparatus to: utilize a runtime error optimization engine to dynamically adjust deployment strategies based on real-time system states and historical error data.

14. The computer program product of claim 8, wherein the code further causes the apparatus to: automatically generate alerts and reports when the machine learning model predicts a deployment failure.

15. A method for automated mesh service-based deployment intelligence, the method comprising:
ingesting data from multiple data sources including at least one of a monitoring system, a database, and an application performance management tool;
storing the ingested data in a structured data storage system;
processing the ingested data to identify deployment patterns and anomalies;
applying a machine learning model to the processed data to generate a predicted potential deployment issue;
orchestrating deployment of software artifacts based on the predicted potential deployment issue; and
optimizing a deployment process in real-time to address the predicted potential deployment issue prior to the deployment.

16. The method of claim 15, wherein the method further comprises: implementing a feedback mechanism to refine the machine learning model based on an outcome of a previous deployment.

17. The method of claim 15, wherein the method further comprises: preprocessing the ingested data by normalizing and cleaning the ingested data to conform to a selected format for analysis by the machine learning model.

18. The method of claim 15, wherein the method further comprises: receiving real-time data streams and batching process data inputs from the multiple data sources, enabling synchronous and asynchronous data processing.

19. The method of claim 15, wherein the method further comprises: utilizing a runtime error optimization engine to dynamically adjust deployment strategies based on real-time system states and historical error data.

20. The method of claim 15, wherein the method further comprises: automatically generating alerts and reports when the machine learning model predicts a deployment failure.

* * * * *